(12) United States Patent
Ueyama et al.

(10) Patent No.: US 7,053,582 B2
(45) Date of Patent: May 30, 2006

(54) CONTROL MAGNETIC BEARING DEVICE

(75) Inventors: Hirochika Ueyama, Hirakata (JP); Yasukata Miyagawa, Matsubara (JP)

(73) Assignee: Koyo Seiko Co., Ltd., Osaka (JP)

( * ) Notice: Subject to any disclaimer, the term of this patent is extended or adjusted under 35 U.S.C. 154(b) by 0 days.

(21) Appl. No.: 11/296,232

(22) Filed: Dec. 8, 2005

(65) Prior Publication Data

US 2006/0082342 A1    Apr. 20, 2006

Related U.S. Application Data

(63) Continuation of application No. 10/774,424, filed on Feb. 10, 2004, now abandoned.

(30) Foreign Application Priority Data

Sep. 18, 2002 (JP) ............................ 2002-270910

(51) Int. Cl.
G05D 23/275 (2006.01)
H02K 5/24 (2006.01)
H02K 7/09 (2006.01)
(52) U.S. Cl. ...................... 318/632; 318/591; 318/629; 318/630; 310/90.5
(58) Field of Classification Search ................ 318/603, 318/629, 630, 632, 721, 591, 800–803
See application file for complete search history.

(56) References Cited

U.S. PATENT DOCUMENTS

| 4,000,513 | A |  | 12/1976 | Precourt |
| 5,024,025 | A |  | 6/1991 | Kihara et al. |
| 5,133,158 | A |  | 7/1992 | Kihara et al. |
| 5,760,510 | A |  | 6/1998 | Nomura et al. |
| 5,925,957 | A | * | 7/1999 | Chapman ................... 310/90.5 |
| 5,998,899 | A |  | 12/1999 | Rosen et al. |
| 6,005,315 | A | * | 12/1999 | Chapman ................... 310/90.5 |
| 6,023,152 | A | * | 2/2000 | Briest et al. ................. 323/207 |
| 6,091,215 | A |  | 7/2000 | Lovett et al. |
| 6,147,425 | A |  | 11/2000 | Ueyama et al. |
| 6,215,218 | B1 |  | 4/2001 | Ueyama |
| 6,288,510 | B1 | * | 9/2001 | Toyama ...................... 318/461 |
| 6,455,966 | B1 | * | 9/2002 | Barada et al. ............. 310/90.5 |
| 6,617,734 | B1 | * | 9/2003 | Taniguchi et al. ......... 310/90.5 |

(Continued)

FOREIGN PATENT DOCUMENTS

JP        2002013532 A   *   1/2002

(Continued)

Primary Examiner—Paul Ip
(74) Attorney, Agent, or Firm—Oblon, Spivak, McClelland, Maier & Neustadt, P.C.

(57) ABSTRACT

A control magnetic bearing device comprises a plurality of control magnetic bearings for contactlessly supporting a rotor, an electric motor for rotating the rotor, a magnetic bearing drive circuit for driving the magnetic bearings, an inverter for driving the electric motor, a main control circuit for controlling the magnetic bearing drive circuit and the inverter, and a power source unit connected to an external power source for supplying electric power to the magnetic bearing drive circuit, the inverter and the main control unit. The main control unit has software-programmable digital processing means for controlling the inverter in accordance with an input voltage value from the power source unit.

3 Claims, 2 Drawing Sheets

U.S. PATENT DOCUMENTS

| | | |
|---|---|---|
| 6,653,756 B1 | 11/2003 | Ueyama et al. |
| 6,787,955 B1 | 9/2004 | Ueyama |
| 6,850,426 B1 * | 2/2005 | Kojori et al. ............... 363/123 |
| 2002/0047400 A1 | 4/2002 | Ueyama et al. |
| 2002/0047402 A1 * | 4/2002 | Taniguchi et al. ......... 310/90.5 |
| 2002/0047403 A1 * | 4/2002 | Taniguchi et al. ......... 310/90.5 |
| 2003/0001445 A1 | 1/2003 | Paden et al. |
| 2005/0052146 A1 | 3/2005 | Someya |
| 2005/0174087 A1 * | 8/2005 | Ueyama et al. ............. 318/802 |

FOREIGN PATENT DOCUMENTS

| | | |
|---|---|---|
| JP | 2003293980 A  * | 10/2003 |
| JP | 2004 108464 A | 4/2004 |

* cited by examiner

CONTROL MAGNETIC BEARING DEVICE

This application is a continuation of application Ser. No. 10/774,424 filed on Feb. 10, 2004, now abandoned.

BACKGROUND OF THE INVENTION

The present invention relates to magnetic bearing devices of the control type, for example, for use in turbo-molecular pumps.

Magnetic bearing devices of the type mentioned comprise a rotor contactlessly supported by a plurality of control magnetic bearings and rotatable by an electric motor to be driven by an inverter. Electric power is supplied from an external power source, i.e., a commercial AC power source (200 V), to a power source unit for supplying electric power (direct current), for example, to the inverter, a magnetic bearing drive circuit and a main control unit for controlling these components. The power source unit rectifies and smooths the alternating current from the commercial power source and supplies the resulting current to the inverter, etc.

However, the conventional magnetic bearing device has the problem that when the input voltage from the power source unit to the inverter involves fluctuations due to voltage variations of the external power source, the motor current (the current actually flowing through the electric motor) also fluctuates correspondingly, consequently varying the rotational speed of the motor and failing to maintain the gas discharge performance of the pump at a constant level.

In the main control unit of the conventional magnetic bearing device, for example, in a PI control calculation unit thereof, the value of current to be supplied to the motor is calculated from the difference between a target value of rotational speed of the motor and the detected value of rotational speed thereof, and the calculated current value is output to the inverter as a command current value. Accordingly, even when the command current value to be output to the inverter is constant, the motor current varies if the input voltage from the power source unit to the inverter fluctuates.

The motor current variation can be eliminated by adding a constant-voltage circuit or like hardware to the main control unit, but the device then becomes large-sized and more costly to manufacture.

SUMMARY OF THE INVENTION

An object of the present invention is to solve the above problem and to provide a control magnetic bearing device wherein fluctuations in the motor current due to fluctuations in the input voltage from the power source unit can be suppressed and which is reduced in size and cost.

The present invention provides a control magnetic bearing device comprising a plurality of control magnetic bearings for contactlessly supporting a rotor, an electric motor for rotating the rotor, a magnetic bearing drive circuit for driving the magnetic bearings, an inverter for driving the electric motor, a main control circuit for controlling the magnetic bearing drive circuit and the inverter, and a power source unit connected to an external power source for supplying electric power to the magnetic bearing drive circuit, the inverter and the main control unit, the control magnetic bearing device being characterized in that the main control unit has software-programmable digital processing means for controlling the inverter in accordance with an input voltage value from the power source unit.

Usable as the software-programmable digital processing means is, for example, an MPU (microprocessor), digital signal processor or the like. The term "digital signal processor" as used herein refers to software-programmable hardware which is specifically usable in the present device, receives digital signal inputs, produces digital signal outputs and is adapted for high-speed calculation processing. The processor will hereinafter be referred to as "DSP."

The voltage value input from the power source unit to the main control unit and that input from the power source unit to the inverter are equal to each other. Therefore, when the inverter is controlled by the main control unit in accordance with the voltage value input to the unit from the power source unit, this means that the inverter is controlled in accordance with the voltage value input from the power source unit to the inverter.

The main control unit controls the inverter so as not to produce variations in the motor current even if the input voltage from the power source unit fluctuates.

With the control magnetic bearing device of the invention, the inverter is controlled in accordance with the input voltage value from the power source unit, whereby variations in the motor current due to fluctuations in the input voltage value from the power source unit can be suppressed, consequently suppressing variations in the rotational speed of the motor due to fluctuations in the input voltage value. In the case where the device is incorporated, for example, into a turbo-molecular pump, the pump is capable of exhibiting constant gas discharge performance. Since the main control unit has software-programmable digital processing means for controlling the inverter, the device is serviceable for the pump merely by modifying the software only without the necessity of additionally using a constant-voltage circuit or like hardware. This renders the device reduced in size and less costly.

For example, the main control unit controls the command current value to be output to the inverter, in accordance with the input voltage value from the power source unit.

The main control unit calculates the current value to be supplied to the motor, for example, from the difference between a target rotational speed value of the motor and a detected rotational speed thereof, and controls the command current value to be output to the inverter so that the motor current value becomes equal to the calculated current value despite fluctuations in the voltage value input from the power source unit. Stated more specifically, when the input voltage value drops, the command current value is increased for the calculated current value, whereas if the input voltage value increases, the command current value is lowered for the calculated current value. For example, as the input voltage value increases, the command current value is lowered linearly for the same calculated current value.

In this way, the motor current can be made to remain free of variations for the same command current value even if the input voltage value fluctuates.

For example, the main control unit alters the upper limit of the command current value to be output to the inverter, in accordance with the input voltage value from the power source unit.

The main control unit alters the upper limit of the command current value so that the motor current, i.e., the maximum value of motor current, remains the same when the upper limit is output as the command current value even if the input voltage value fluctuates. Stated more specifically, when the input voltage value drops, the upper limit of the command current value is increased, whereas if the input voltage value increases, the upper limit of the command current value is lowered. For example, as the input voltage value increases, the upper limit of the command current value is lowered linearly.

Even if the input voltage value fluctuates, the maximum value of the motor current is made constant in this way to suppress variations in the maximum value of the motor current.

For example, the main control unit comprises a control calculator for calculating the current value to be supplied to the electric motor from the difference between a target rotational speed value of the motor and a detected rotational speed value thereof, a command value output portion for limiting the calculated current value from the control calculator to a value not higher than a predetermined upper limit and outputting the limited value as a command current value, and an upper limit altering portion for altering the upper limit in the command value output portion in accordance with the input voltage value from the power source unit.

Even if the input voltage value fluctuates, the maximum value of the motor current is made constant also in this case as above to suppress variations in the maximum value of the motor current.

DETAILED DESCRIPTION OF THE INVENTION

The present invention as applied to a turbo-molecular pump will be described below with reference to the drawings.

Figure 1:
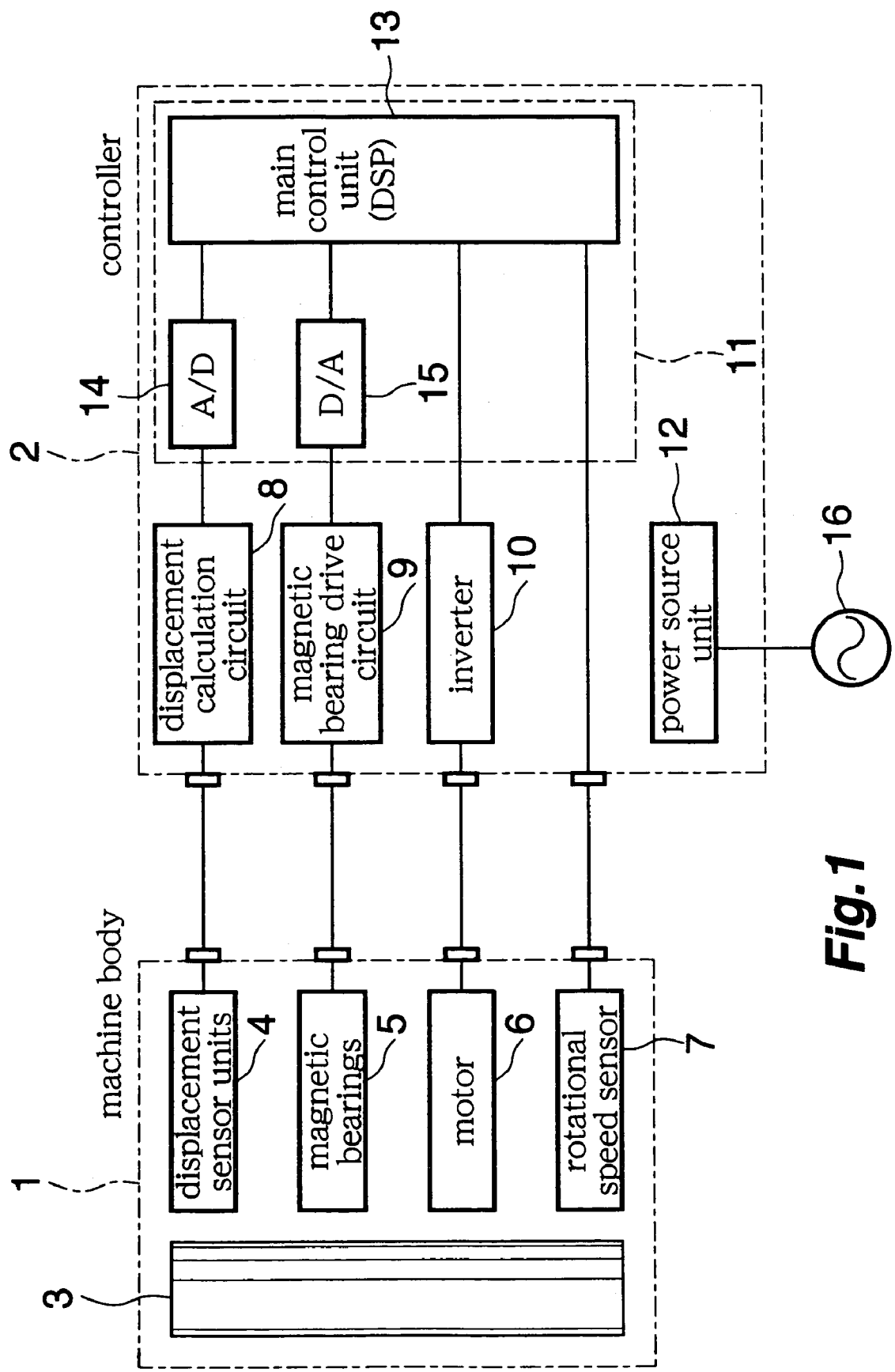
FIG. 1 is a schematic diagram showing an embodiment of the present invention as applied to a turbo-molecular pump, i.e., a control magnetic bearing device.

FIG. 1 schematically shows the construction of the turbo-molecular pump.

The pump comprises a machine body 1 providing a pump main body, and a controller 2 providing a pump control unit serving as control means.

The machine body 1 has a rotor (pump rotor) 3 constituting a pump, displacement sensor units 4, control magnetic bearings 5, an induction machine which is, for example, a built-in electric motor 6, and a rotational speed sensor 7 serving as a rotation speed detecting means.

The controller 2 has a displacement calculation circuit 8, magnetic bearing drive circuit 9, inverter 10, DSP board 11 and power source unit 12. The DSP board 11 has a main control unit 13, AD converter 14 and DA converter 15.

The magnetic bearings 5 include a control axial magnetic bearing disposed at one location along the axial direction of the rotor 3 for contactlessly supporting the rotor 3 with respect to the direction of an axial control axis, and two control radial magnetic bearings arranged respectively at two locations along the axial direction of the rotor 3, each of the radial magnetic bearings contactlessly supporting the rotor 3 with respect to two radial control axes orthogonal to each other. The axial magnetic bearing comprises a pair of electromagnets (axial electromagnets) so arranged as to hold the rotor 3 from opposite sides thereof in the direction of the axial control axis. Each of the radial magnetic bearings comprises a pair of electromagnets (radial electromagnets) provided for each of the radial control axes and so arranged as to hold the rotor 3 from opposite sides thereof in the direction of the radial control axis.

Although not shown, the displacement sensor units 4 include an axial displacement sensor unit and a radial displacement sensor unit. The axial displacement sensor unit comprises an axial displacement sensor for detecting the displacement of the rotor 3 in the direction of the axial control axis. The radial displacement sensor unit comprises a pair of radial displacement sensors provided for each of the radial control axes at the location of each of radial magnetic bearings and so arranged as to hold the rotor 3 from opposite sides of thereof in the direction of the radial control axis. The displacement calculation circuit 8 calculates for the axial control axis the displacement of the rotor 3 in the direction of the axial control axis from the output of the axial displacement sensor, calculates for each of the radial control axes the displacement of the rotor 3 in the direction of the radial control axis based on the output of the corresponding pair of radial displacement sensors, and outputs displacement signals corresponding to the calculated displacement values to the main control unit 13 via the AD converter 14. The displacement sensor units 4 and the displacement calculation circuit 8 constitute displacement detecting means for detecting the displacement of the rotor 3.

The main control unit 13 comprises a DSP which is software-programmable digital processing means, and controls the magnetic bearing control circuit 9, the inverter 10, etc.

The power source unit 12 is connected to a 200-V commercial power source 16 which is an external power source, rectifies and smooths alternating current from the power source 16 and supplies DC power to the magnetic bearing drive circuit 9, inverter 10, main control unit 13, etc.

The main control unit 13 calculates energizing current values for the respective electromagnets of the magnetic bearings 5 based on the displacement signals from the AD converter 14, and feeds energizing current signals corresponding to the calculated values to the drive circuit 9 via the DA converter 15.

The magnetic bearing drive circuit 9 has a plurality of power amplifiers corresponding to the respective electromagnets of the bearings 5 and supplies energizing currents output from the DA converter 15 and in proportion to the energizing current signals to the respective corresponding electromagnets of the bearings 5, whereby the rotor 3 is contactlessly supported at the specified target position.

The motor 6 rotatingly drives the rotor 3 as supported contactlessly. The rotational speed sensor 7 detects the rotational speed of the rotor 3 and outputs a constant number of pulse signals (for example, one pulse signal) per turn of rotation of the rotor 3 to the main control unit 13. As will be described in detail later, the main control unit 13 calculates the rotational speed of the rotor 3 from the pulse signals from the sensor 7 and outputs a command current signal to the inverter 10 based on the calculated speed for controlling the rotational speed of the motor 6. Based on the command current signal from the main control unit 13, the inverter 10 controls the rotational speed of the motor 6, for example, by the PWM method. As a result, the rotor 3 is held at an approximately constant rotational speed during steady-state rotation.

The main control unit 13 further samples the value of input voltage from the power source unit 12 at intervals of a predetermined period of time (e.g., 5 seconds) and controls the command current value to be output to the inverter 10 in accordance with the input voltage value.

Figure 2:
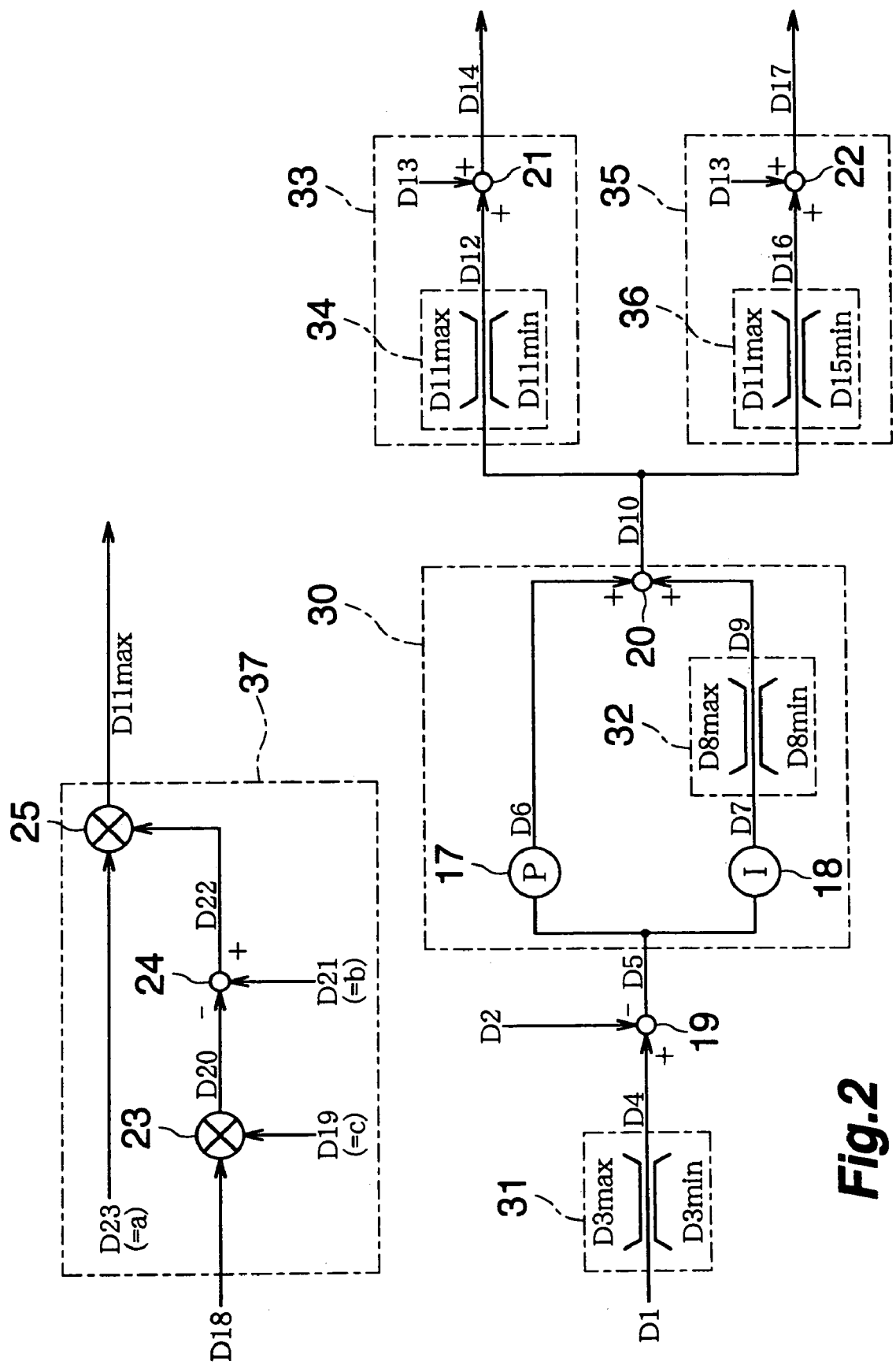
FIG. 2 is a functional block diagram showing an example of motor rotational speed control processing to be performed by a main control unit.

FIG. 2 is a functional block diagram showing an example of function of a motor control portion (portion for controlling the rotational speed of the motor) included in the main control unit 13. Next with reference to the drawing, a description will be given of an exemplary procedure for controlling the rotational speed of the motor 6 by the motor control portion.

The motor control portion is adapted for the PI control of the rotational speed of the motor 6, and comprises a PI control calculator 30 having a proportional operating portion 17 and an integral operating portion 18.

With reference to FIG. 2, indicated at D1 is a target rotational speed value to be set inside the motor control portion, and at D2 is a rotational speed value of the motor 6 detected by the rotational speed sensor 7.

In the motor control portion, the target rotational speed value is first compared with the highest settable rotational speed D3max and the lowest settable rotational speed D3min by a target value limiter 31, and D1 as limited to a value between D3max and D3min, i.e., a value D4, is fed as a target rotational speed value to a subtracting portion 19. The difference D5 between the target value D4 and the detected rotational speed value D2 is calculated by the subtracting portion 19 and fed to the proportional operating portion 17 and to the integral operating portion 18. The proportion operating portion 17 outputs a proportional output value D6 in proportion to the difference D5 to an adder 20. The integral operating portion 18 delivers an integral output value D7 proportional to the integrated value of the difference D5 to an integral output limiter 32, in which the output value D7 is compared with the highest allowable integral output value D8max and the lowest allowable integral output value D8min. D7 as limited to a value between D8max and D8min, i.e., a value D9, is input to the adder 20 as a limited integral output value. The highest allowable integral output value D8max is a positive value, the lowest allowable integral output value D8min is a negative value, and the absolute values of these values are usually equal to each other. The sum D10 of the proportional output value D6 and the integral output value D9 is calculated by the adder 20. This value D10 is a calculated current value, which is output from the calculator 30.

In the case of acceleration, a current value limiter 34 of a first command value output portion 33 compares the calculated current value D10 with the highest allowable current value D11max which is an upper limit value and with the lowest allowable acceleration current value D11min which is a lower limit value, and D10 as limited to a value between D11max and D11min, i.e., a value D12, is input to an adder 21. The value D12 is a command current value for acceleration. The value D12 is added to a constant value D13 by the adder 21, and the resulting value D14 is delivered from the command value output portion 33 to the inverter 10 as a command current signal.

In the case of deceleration, a current value limiter 36 of a second command value output portion 35 compares the value D10 with the highest allowable current value D11max and with the lowest allowable deceleration current value D15min which is a lower limit value, and D10 as limited to a value between D11max and D15min, i.e., a value D16, is input to an adder 22. The value D16 is a command current value for deceleration. The value D16 is added to the constant value D13 by the adder 22, and the resulting value D17 is delivered from the command value output portion 35 to the inverter 10 as a command current signal.

On the other hand, an input voltage value D18 from the power source unit 12 is input to an integrator 23 of an upper limit altering portion 37. The product D20 of D18 by a constant value D19 is calculated by the integrator 23, and the product D20 is fed to a subtracting portion 24. The difference D22 between D20 and a constant value D21 is calculated by the subtracting portion 24 and input to an integrator 25, in which the product of D22 by a constant value D23 is calculated. The resulting value is the above-mentioned highest allowable current value D11max, which is delivered from the upper limit altering portion 37 to the current value limiter 34 or 36.

The upper limit value D11max thus calculated by the altering portion 37 is represented by Equation (1) given below.

$$D11max = D23 \times (D21 - D19 \times D18) \quad (1)$$

Since D23, D21 and D19 are constant values, it is assumed that these values are a, b and c, respectively. Equation (1) can then be rewritten as Equation (2) below.

$$D11max = a \times (b - c \times D18) \quad (2)$$

This Equation (2) indicates that as the input voltage value D18 increases, the upper limit value D11 decreases linearly.

When the upper limit value is fed as a command current value to the inverter 10, the motor current becomes maximum. The above constants a, b and c are so determined that even if the input voltage value D18 fluctuates, the motor current, that is, the maximum value of the motor current, becomes the same when the upper limit value D11max is output as the command current value D12 or D16. In this way, it is possible to make the maximum value of the motor current constant with variations in the maximum current value suppressed, even if the input voltage value fluctuates.

What is claimed is:

1. A control magnetic bearing device comprising:
   a plurality of control magnetic bearings configured to contactlessly support a rotor;
   an electric motor configured to rotate the rotor;
   a magnetic bearing drive circuit configured to drive the magnetic bearings;
   an inverter configured to drive the electric motor;
   a main control unit configured to control the magnetic bearing drive circuit and the inverter; and
   a power source unit connected to an external power source and configured to supply electric power to the magnetic bearing drive circuit, the inverter, and the main control unit,
   wherein the main control unit has software-programmable digital processing means for controlling a command current value to be output to the inverter, in accordance with an input voltage value from the power source unit.

2. A control magnetic bearing device comprising:
a plurality of control magnetic bearings configured to contactlessly support a rotor;
an electric motor configured to rotate the rotor;
a magnetic bearing drive circuit configured to drive the electric motor;
a main control unit configured control the magnetic bearing drive circuit and the inverter; and
a power source unit connected to an external power source and configured to supply electric power to the magnetic bearing drive circuit, the inverter, and the main control unit;
wherein the main control unit has software-programmable digital processing means for altering an upper limit of a command current value to be output to the inverter, in accordance with the input voltage value from the power source unit.

3. The control magnetic bearing device according to claim 2 wherein the main control unit comprises,
a control calculator configured to calculate a current value to be supplied to the electric motor from the difference between a target rotational speed value of the motor and a detected rotational speed value thereof,
a command value output portion configured to limit the calculated current value from the control calculator to a value not higher than a predetermined upper limit and outputting the limited value as a command current value, and
an upper limit altering portion configured to alter the upper limit in the command value output portion in accordance with the input voltage value from the power source unit.

* * * * *

UNITED STATES PATENT AND TRADEMARK OFFICE
CERTIFICATE OF CORRECTION

| | | |
|---|---|---|
| PATENT NO. | : 7,053,582 B2 | Page 1 of 1 |
| APPLICATION NO. | : 11/296232 | |
| DATED | : May 30, 2006 | |
| INVENTOR(S) | : Ueyama et al. | |

It is certified that error appears in the above-identified patent and that said Letters Patent is hereby corrected as shown below:

On the title page, Item (30), the Foreign Application Priority Data should be deleted.

Signed and Sealed this

First Day of August, 2006

JON W. DUDAS
*Director of the United States Patent and Trademark Office*